United States Patent [19]

Akimoto et al.

[11] Patent Number: 4,481,789

[45] Date of Patent: Nov. 13, 1984

[54] AIR CONDITIONER FOR VEHICLES

[75] Inventors: Ryosaku Akimoto; Nobuaki Ito, both of Nagoya, Japan

[73] Assignees: Mitsubishi Jukogyo Kabushiki Kaisha, Tokyo; Churyo Engineering Co., Ltd., Nagoya, both of Japan

[21] Appl. No.: 358,297

[22] Filed: Mar. 15, 1982

[30] Foreign Application Priority Data

Mar. 25, 1981 [JP] Japan .................................. 56-43704

[51] Int. Cl.³ ........................ F25B 41/00; G05D 23/00
[52] U.S. Cl. ........................................ 62/209; 62/229; 236/91 F
[58] Field of Search .................... 62/211, 209, 229; 236/91 F, 91 G, 37

[56] References Cited

PUBLICATIONS

Motor Air Conditioner & Heater Manual 4th Edition; Louis C. Forier, SAF.

*Primary Examiner*—William E. Wayner
*Attorney, Agent, or Firm*—Toren, McGeady and Stanger

[57] ABSTRACT

An air conditioner for vehicles in which the temperature of an evaporator is detected and an ON-OFF control of the compressor is achieved to maintain the evaporator temperature at a pre-set temperature. The air conditioner has means for detecting the temperature of air flowing into the evaporator, and means for varying the pre-set temperature in such a manner that the pre-set temperature is increased as the detected air temperature is decreased and is decreased as the detected air temperature is increased.

6 Claims, 8 Drawing Figures

AIR CONDITIONER FOR VEHICLES

BACKGROUND OF THE INVENTION

The present invention relates to an air conditioner for vehicles and, more particularly, to an air conditioner system in which the temperature of air flowing into the evaporator of the air cooler is detected and the set temperature of the evaporator is changed to compensate for the change in the detected air temperature.

In the conventional air conditioner for vehicles, the air temperature in or around the evaporator is detected by a thermostat and the compressor is turned on and off so as to maintain the air temperature at the set level. The thermostat is usually set to operate at a temperature around 0° C., in order to prevent frosting or icing of the evaporator.

In current automative air conditioners, the control of temperature of air blown into the passenger's compartment is effected by a so-called air mix type system in which the air cooled and dehumidified by the evaporator is again heated to a suitable temperature by a heater before the air is discharged into the compartment.

In such a case, once the air conditioner switch is turned on, the compressor is operated repeatedly such that the evaporator temperature is maintained around 0° C. Therefore, the compressor operates frequently even in the seasons in which the demand for cooling is not so large, e.g., spring, autumn and winter. In consequence, the fuel consumption is increased and the driveability of the automobile deteriorates disadvantageously.

SUMMARY OF THE INVENTION

Accordingly, an object of the invention is to provide an air conditioner for vehicles which can save energy while achieving a high driveability of the vehicle.

To this end, according to the invention, there is provided an air conditioner for vehicles in which the compressor is turned on and off in accordance with the detected evaporator temperature to maintain the evaporator temperature at a pre-set level, wherein the above-mentioned pre-set temperature is variable, and is varied in such a manner as to compensate for a charge in the temperature of air flowing into the evaporator detected by a temperature detecting means.

Other objects and features of the invention will become clear from the following description of preferred embodiments taken in conjunction with the accompanying drawings.

BRIEF DESCRIPTION OF THE INVENTION

DESCRIPTION OF THE PREFERRED EMBODIMENTS

Figure 1:
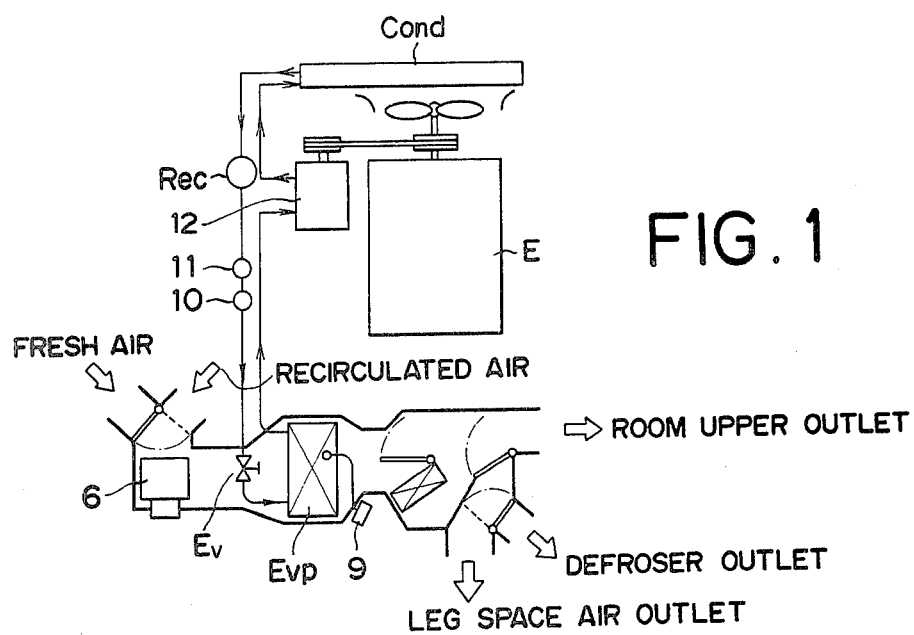
FIG. 1 is a schematic diagram of a conventional automotive air conditioner.

Before turning to the preferred embodiments, an explanation will be made hereinunder as a known automotive air conditioner will be considered with specific reference to FIGS. 1 and 2. Referring first to FIG. 1 which is a schematic diagram of the air conditioner, a compressor 12 driven by an engine E through a belt and pulleys is adapted to compress a refrigerant which is then circulated, as indicated by an arrow, through a refrigerant circuit constituted by a condenser Cond, receiver Rec, high-pressure switch 11, low-pressure switch 10, expansion valve EV and an evaporator Evp, and is finally returned to the compressor 12. The refrigerant is made to expand as it passes the expansion valve EV and is evaporated in the evaporator Evp while absorbing heat thereby to cool the air around the evaporator. The air sucked by a fan 6 is cooled by the evaporator Evp and is distributed to three outlets, i.e., the upper compartment outlet, leg space outlet and defrost outlet.

Figure 3:
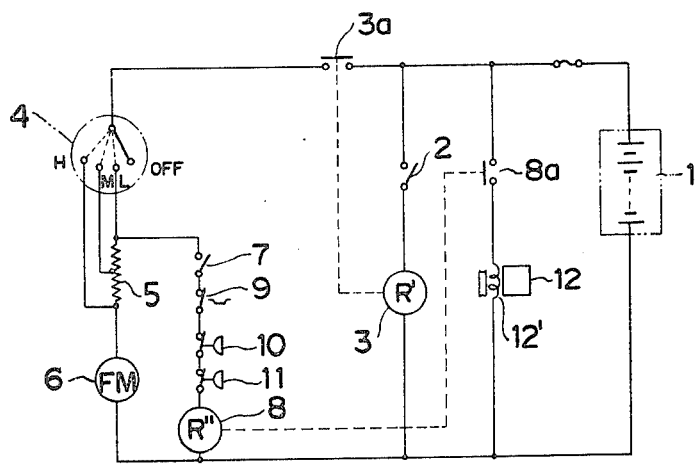
FIG. 3 is a schematic diagram of an automotive air conditioner in accordance with a preferred embodiment of the invention.

FIG. 3 shows an example of the control circuit for controlling the operation of the compressor of the air conditioner shown in FIG. 1. Using a battery 1 as the power source, this control circuit operates as follows. As an ignition switch 2 is turned on, a relay 3 is energized to turn its contact 3a on. Then, the position of a fan switch 4 is suitably selected to control the voltage of the fan motor 6 through a resistor 5. By turning on an air conditioner switch 7 after selecting any one of the positions L, M and H of the fan switch 4, a relay 8 is energized by an electric current supplied through a thermostat 9 for controlling the air temperature at the outlet to compartment, low-pressure switch 10 for protecting the compressor and the high-pressure switch 11 which also functions to protect the compressor, so that the contact 8a is turned on. In consequence, an electromagnetic clutch 12' is energized to drivingly connect the compressor 12 to the engine E, so that the compressor 12 is driven by the engine E. As a result, the temperature of the evaporator Evp is lowered to cool the air passing through the evaporator Evp before the air is relieved into the passenger's compartment.

The control of the air temperature in the compartment is effected by means of the thermostat as explained above. Namely, the setting of the air temperature, detection of the evaporator temperature and the ON-OFF control of the compressor are achieved by this thermostat.

Figure 2:
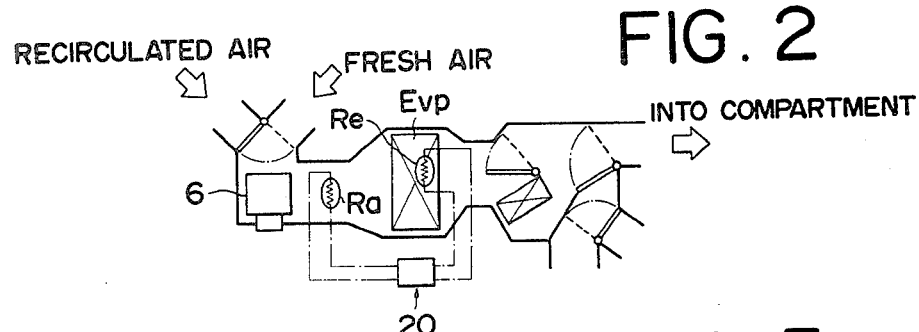
FIG. 2 is a circuit diagram of a control circuit for the conventional automotive air conditioner.
Figure 4:
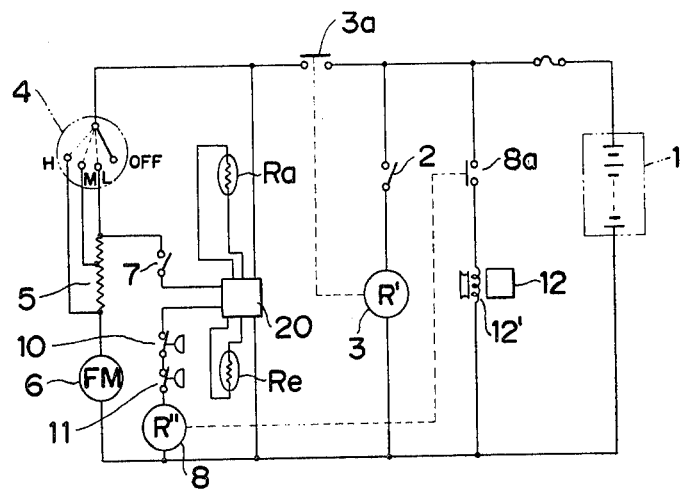
FIG. 4 is a schematic circuit diagram of a control circuit for the automotive air conditioner shown in FIG. 3.
Figure 5:
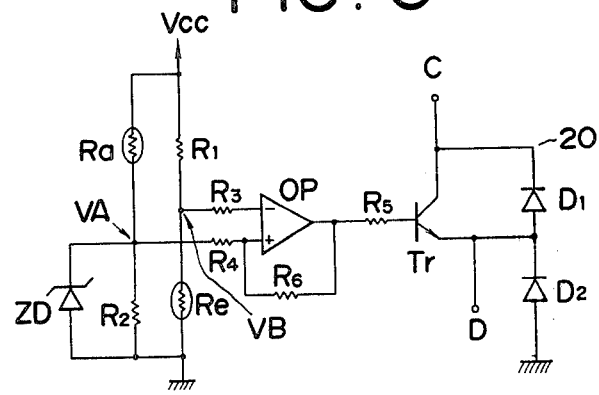
FIG. 5 shows a practical example of a thermo-control circuit incorporated in the control circuit shown in FIG. 4.

An air conditioner for vehicles in accordance with the invention are described hereinunder with reference to FIGS. 3 through 5 in which the same reference numerals are used to denote the same parts or members as those used in FIGS. 1 and 2.

In this air conditioner, the thermostat used in the conventional air conditioner is substituted by a combination of thermistors having a negative temperature coefficient and a thermo-control circuit as shown in FIG. 3. More specifically, a reference symbol Ra represents a thermistor having a negative temperature coefficient. This thermistor Ra is disposed at the upstream side of the evaporator Evp so as to detect the temperature of air flowing into the evaporator. Another thermistor Re having negative temperature coefficient is disposed in the evaporator so as to detect the temperature in the evaporator. A reference numeral 20 denotes a thermo-control circuit adapted for making the ON-OFF control of the compressor 12 through the relay 8, upon receipt of the outputs from the thermistors Ra, Re.

As shown in FIG. 4, the thermo-control circuit 20 is connected between the air conditioner switch 7 and the low-pressure switch 10. A preferred form of this circuit is shown in FIG. 5. In this Figure, Vcc represents a regulated power supply voltage, $V_A$ represents the voltage at a point A at which the voltage Vcc is divided by the thermistor Ra and a bridge resistance $R_2$, and $V_B$ represents the voltage at a point B at which the voltage Vcc is divided by a bridge resistance $R_1$ and the thermistor Re.

Namely, the voltages $V_A$ and $V_B$ are represented as follows, respectively.

$$V_A = \frac{R_2 \cdot V_{cc}}{R_2 + R_a}$$

$$V_B = \frac{R_e \cdot V_{cc}}{R_e + R_1}$$

A symbol ZD designates a constant voltage diode which is connected in parallel with the bridge resistance $R_2$ and adapted to prevent the voltage $V_A$ from becoming higher than a predetermined value. Symbols $R_3$, $R_4$ and $R_5$ represent impedance matching resistors, OP represents a differential amplifier adapted to receive the voltages $V_A$ and $V_B$, and $R_6$ represents a resistor for determing the offset of the differential amplifier. A switching transsistor Tr is adapted to operate by the output from the differential amplifier OP and has an input terminal C connected to the air conditioner switch 7 and an output terminal D connected to the low-pressure switch 10. Furthermore, a symbol $D_1$ represents a diode for protecting the transistor Tr, while $D_2$ represents a diode connected to the output terminal D and adapted to absorb the surge of the relay 8.

The thermo-controlled circuits operates as follows. At first, the air conditioner switch is turned on. Supposing that the temperature of air flowing into the evaporator is higher than 30° C., the resistance value of the thermistor Ra is decreased so that the voltage $V_A$ takes a high level. On the other hand, the thermistor Re takes a small resistance value so that the voltage $V_B$ is low, in the state immediately after the start of the compressor. When the condition of $V_A > V_B$ is met, the differential amplifier OP applies an output voltage to the base of the transistor Tr to turn the latter on. In consequence, the input terminal C and the output terminal D are connected electrically to permit the relay 8 to operate, so that the electromagnetic clutch 12' is inergized. As a result, the compressor 12 is driven by the engine E.

The evaporator Evp is cooled by the operation of the compressor, so that the evaporator temperature is lowered to increase the resistance value Re of the thermistor Re. The temperature of the evaporator Evp is further lowered and, when the voltage $V_B$ comes to equal to $V_A$, the output from the differential amplifier OP is nullified to turn the transistor Tr off, so that the compressor stops to operate. The temperature of the evaporator Evp is increased as the compressor stops to operate, so that the resistance value of the thermistor Re is lowered. In consequence, a state $V_A > V_B$ is created so that the transistor Tr is turned on by the output from the differential amplifier OP and the compressor is started again. This operation is performed repetitiously to maintain a predetermined temperature of cooled air. Since an offset voltage is applied to the differential amplifier by the resistor $R_6$, a general hysteresis of 2° to 3° C. is given for the temperature at which the compressor is turned on and off, thereby to ensure a stable operation and pause of the compressor.

When the air temperature at the inlet side of the evaporator is lowered due to a reduction in the ambient air temperature or cooling load, according to the invention, the set temperature for the operation of the compressor is shifted to the higher side. In other words, when the cooling load is reduced, the refrigerating power is automatically decreased correspondingly.

As the air temperature at the inlet side of the evaporator is lowered, the resistance value of the thermistor Ra is increased to lower the voltage $V_A$. When the condition of $V_A < V_B$ is met, the output from the differential amplifier OP is nullified to stop the compressor. The evaporator temperature is increased as the compressor stops to operate, so that the resistance value of the thermistor Re comes down to lower the voltage $V_B$. As the evaporator temperature is increased to meet the condition of $V_A > V_B$, the differential amplifier OP starts to operate so that the compressor is driven. The compressor is then stopped as the evaporator temperature is lowered, as explained before.

To the contrary, as the temperature of air flowing into the evaporator is increased, the set temperature is lowered to increase the refrigeration power.

Figure 7:
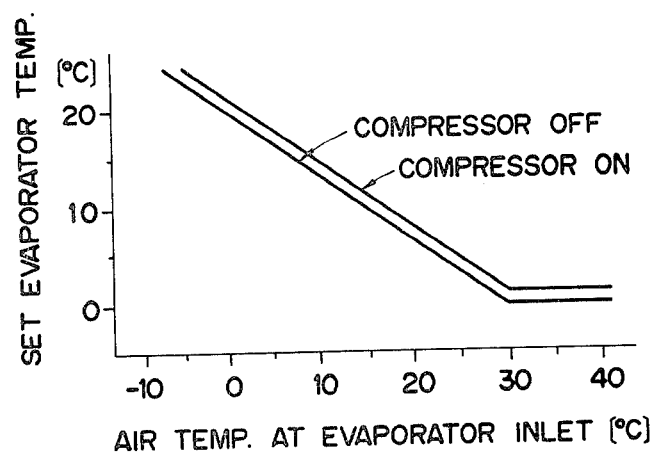
FIG. 7 is a diagram showing the relationship between the air temperature at evaporator inlet and the set temperature of the evaporator.
Figure 6:
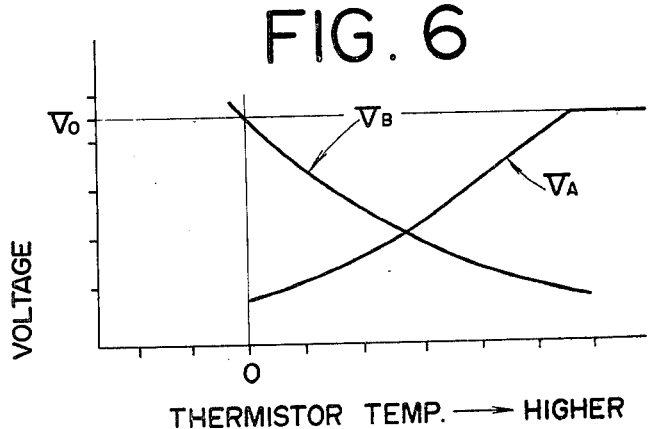
FIG. 6 is a diagram showing the relationship between voltages $V_A$, $V_B$ and the temperature of thermistor in a bridge circuit shown in FIG. 5.

FIG. 6 shows how the voltages $V_A$ and $V_B$ are varied in accordance with the change in the temperatures of the thermistors Ra and Re. It will be seen that the voltage $V_A$ is determined by the temperature of air flowing into the evaporator, while the voltage $V_B$ is determined by the evaporator temperature. The compressor operates only when the condition of $V_A > V_B$ is met. Therefore, the operation temperature of the compressor under the ON-OFF control, i.e., the set value of the air temperature coming out of the evaporator is varied as shown in FIG. 7.

Specifically, as the temperature of air flowing into the evaporator is increased, the set value of the evaporator is lowered, and vice versa.

As the voltage $V_A$ is increased further, the operation amplifier OP operates to correspondingly increase the voltage $V_B$, so that the operation temperature of the compressor comes down below the freezing temperature of the evaporator. The constant voltage diode ZD is provided for such a reduction of the operation temperature of the compressor. Namely, as shown in FIG. 6, the voltage $V_A$ is saturated by the voltage $V_0$ which is determined by the constant voltage diode ZD, however the temperature of the thermistor Ra may be increased. It is, therefore, possible to maintain the operation temperature of the compressor at the freezing prevention temperature, i.e., around 0° C., even when the air temperature at the evaporator inlet is increased by an increase of the refrigeration load.

To the contrary, as the temperature of air flowing into the evaporator comes down, the operation temperature of the compressor is increased and, as the temperature of air flowing into the evaporator is further lowered to a level below the operation temperature of the compressor, the compressor stops to operate completely. That is, the compressor does not work at all under the condition where no refrigeration is needed.

The operation of the compressor, however, is necessary even when the ambient air temperature is low, e.g., 5° C., as in the case where it rains to cloud the window by high humidity. If the air conditioning is effected in this state by inducing the ambient air, the compressor does not work because the air temperature at the air inlet side of the evaporator is as low as 5° C. However, if the air conditioner is manipulated to permit the recirculation of the room air, the temperature of air flowing into the evaporator is increased because the room air temperature is as high as 25° C. Therefore, the set temperature is lowered to 3° to 5° C., so that the compressor starts to operate to dehumidify the air to clean the window in a short time.

Figure 8:
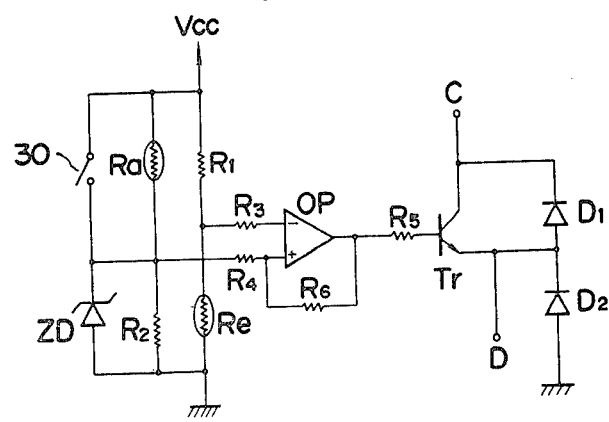
FIG. 8 is a circuit diagram of a modification of the thermo-control circuit shown in FIG. 5.

FIG. 8 is a circuit diagram of another preferred example of the thermo-controller. More specifically, this circuit is formed by connecting a coldest switch 30 connected in parallel to the thermistor Ra of the thermo-control circuit shown in FIG. 5. In operation, as the coldest switch 30 is turned on, the voltage $V_A$ takes the maximum level $V_0$ regardless of the resistance value of the thermistor Ra. Therefore, the set temperature of the evaporator is shifted to the lowermost level to permit the compressor to operate with its maximum cooling power. This thermo-control circuit operates in the same manner as that shown in FIG. 5, when the coldest switch 30 is in the off state.

By installing the thermistor Ra for detecting the air temperature flowing into the evaporator at a place suitable for the detection of the ambient air temeprature, e.g., at the front side of the automobile out of the compartment, it is possible to control the operation of the compressor in accordance with the ambient air temperature solely.

As will be understood from the foregoing description of the preferred embodiments, the present invention offers the following advantages.

(1) The level of the cooling load is detected through the air temperature flowing into the evaporator and the cooling power is automatically optimized for the load. In consequence, the wasteful operation of the compressor is avoided to save the energy considerably.

(2) The compressor is stopped automatically when the ambient air temperature is lowered to such a level as not to necessitate the cooling. It is, therefore, possible to save the energy and to eliminate the necessity for the frequent turning on and off of the air conditioner switch as in the case of the conventional air conditioner. In consequence, the manipulation of the air conditioner is simplified to contribute to the safety of the driving, and the driveability of the automobile is improved correspondingly.

(3) When the ambient air temperature is low and the humidity is high, the compressor is turned on automatically by switching the operation mode to permit the recirculation of air. In consequence, the dehumidification function is recovered to promptly get rid of cloud on the window.

(4) The advantages mentioned above can easily be attained by a simple circuit as shown in FIG. 5.

(5) It is possible to automatically control the air conditioner such that the operation temperature at which the compressor operates does not come down below the freezing temperature, even when the cooling load is increased.

(6) Frosting of the evaporator can be avoided without fail even when the blower is stopped for any reason during the cooling operation.

(7) Since the sensor is attached to the inside of the evaporator, it is possible to effect a stable control at high response characteristics.

What is claimed is:

1. An air conditioner for vehicles having means for detecting the temperature of an evaporator and adapted to effect ON-OFF control of a compressor to maintain the evaporator temperature at the same level as a pre-set temperature, characterized by comprising: means for detecting the air temperature of the air flowing into said evaporator; and means for varying said pre-set temperature in accordance with said air temperature such that said pre-set temperature is lowered as said air temperature becomes higher and is made higher as said air temperature becomes lower, said means for varying the pre-set temperature including: an input circuit having two temperature detection elements for detecting the temperature of air flowing into said evaporator and a temperature detection element for detecting the temperature of said evaporator, and adapted to produce a reference voltage $V_A$ which increases as the air temperature is increased and a voltage $V_B$ which decreases as the evaporator temperature is increased; and a comparator circuit for receiving said voltages $V_A$ and $V_B$ and adapted to produce an output for effecting an ON-OFF control of said air compressor.

2. An air conditioner as claimed in claim 1, wherein said input circuit consists of a bridge circuit including two thermistors constituting said temperature detection elements and other two resistors.

3. An air conditioner as claimed in claim 1, wherein said voltage $V_A$ has an upper limit value $V_0$, and means are provided for maintaining said voltage $V_A$ at the upper limit level $V_0$ when the air temperature is higher than a predetermined level.

4. An air conditioner as claimed in claim 1, wherein said upper limit voltage $V_0$ is provided by a constant voltage diode connected between a point at which said voltage $V_A$ is obtained and the ground.

5. An air conditioner as claimed in claim 1, wherein a switch is disposed between the point at which said voltage $V_A$ is obtained and a positive D.C. voltage power supply, thereby to make it possible to maintain said voltage $V_A$ at said upper limit level $V_0$ regardless of the temperature of air flowing into said evaporator.

6. An air conditioner as in claim 1, wherein said input circuit comprises a bridge circuit including two thermistors forming said temperature detection elements and two other resistors.

* * * * *